(12) United States Patent
Fumagalli et al.

(10) Patent No.: US 11,224,898 B2
(45) Date of Patent: Jan. 18, 2022

(54) METHOD FOR CONTROLLING SORTING MACHINES

(71) Applicant: FIVES INTRALOGISTICS S.P.A. CON SOCIO UNICO, Lonate Pozzolo (IT)

(72) Inventors: Matteo Fumagalli, Castano Primo (IT); Lorenzo Chierego, Varese (IT); Riccardo Macchi, Samarate (IT)

(73) Assignee: FIVES INTRALOGISTICS S.P.A. CON SOCIO UNICO, Lonate Pozzolo (IT)

( * ) Notice: Subject to any disclaimer, the term of this patent is extended or adjusted under 35 U.S.C. 154(b) by 237 days.

(21) Appl. No.: 16/222,551

(22) Filed: Dec. 17, 2018

(65) Prior Publication Data

US 2019/0184430 A1 Jun. 20, 2019

(30) Foreign Application Priority Data

Dec. 19, 2017 (IT) .................. 102017000146244

(51) Int. Cl.
| | |
|---|---|
| *B07C 5/02* | (2006.01) |
| *B07C 5/344* | (2006.01) |
| *B07C 5/38* | (2006.01) |
| *B07C 3/02* | (2006.01) |
| *B65G 43/08* | (2006.01) |
| *B65G 47/46* | (2006.01) |

(Continued)

(52) U.S. Cl.
CPC ............ *B07C 5/362* (2013.01); *B07C 5/36* (2013.01); *B65G 47/96* (2013.01)

(58) Field of Classification Search
CPC .......... B07C 5/36; B07C 5/361; B07C 5/362; B07C 3/08; B65G 47/96; B65G 47/50
USPC ........................ 209/707, 552, 606
See application file for complete search history.

(56) References Cited

U.S. PATENT DOCUMENTS 4,609,922 A * 9/1986 Boegli ................ G06K 7/0008
340/993
5,588,520 A 12/1996 Affaticati et al.
(Continued)

FOREIGN PATENT DOCUMENTS

| CN | 1390760 A | 1/2003 |
| CN | 103143510 A | 6/2013 |

(Continued)

*Primary Examiner* — Michael McCullough
*Assistant Examiner* — Molly K Devine
(74) *Attorney, Agent, or Firm* — Pearne & Gordon LLP

(57) ABSTRACT

A control method for sorting machines including carriages (2), each carriage including a loading-unloading device (3) which can be selectively activated for loading-unloading an object (O) from the carriage and an electronic unit (4) configured to receive and analyse a digital signal (20), includes the steps of: moving the carriage along a sorting direction having a plurality of loading stations (9) and unloading stations (10) each including respective inductors (11); generating by means of the inductors a magnetic field with a variable frequency modulating the digital signal uniquely associated with an operating mode selected from a plurality of operating modes, the digital signal including a bit string; transmitting, by electromagnetic induction, the digital signal to the electronic unit of the carriage; and activating the loading-unloading device according to operating mode uniquely associated with the received digital signal.

17 Claims, 7 Drawing Sheets

(51) Int. Cl.
 *B07C 5/36* (2006.01)
 *B65G 47/96* (2006.01)

(56) References Cited

U.S. PATENT DOCUMENTS

| | | | |
|---|---|---|---|
| 6,749,413 | B2 | 6/2004 | Fare |
| 6,820,561 | B2 | 11/2004 | Soldavini et al. |
| 10,633,189 | B2 * | 4/2020 | Fumagalli ................ B07C 5/36 |
| 10,730,078 | B2 | 8/2020 | Wagner et al. |
| 2002/0076460 | A1 | 6/2002 | Fare |
| 2002/0079254 | A1 | 6/2002 | Soldavini et al. |
| 2017/0157649 | A1 | 6/2017 | Wagner et al. |
| 2020/0306799 | A1 | 10/2020 | Wagner et al. |

FOREIGN PATENT DOCUMENTS

| | | | | |
|---|---|---|---|---|
| CN | 108602630 | A | 9/2018 | |
| EP | 481341 | A * | 10/1991 | ............ B65G 43/00 |
| EP | 1216938 | A1 * | 6/2002 | ............ B65G 47/50 |
| EP | 1216938 | A1 | 6/2002 | |
| EP | 1223238 | A2 | 7/2002 | |
| JP | H0873022 | A | 3/1996 | |
| JP | 2002226038 | A | 8/2002 | |
| JP | 3833734 | B2 | 10/2006 | |
| JP | 4108972 | B2 | 6/2008 | |
| WO | 2004011351 | A2 | 2/2004 | |

\* cited by examiner

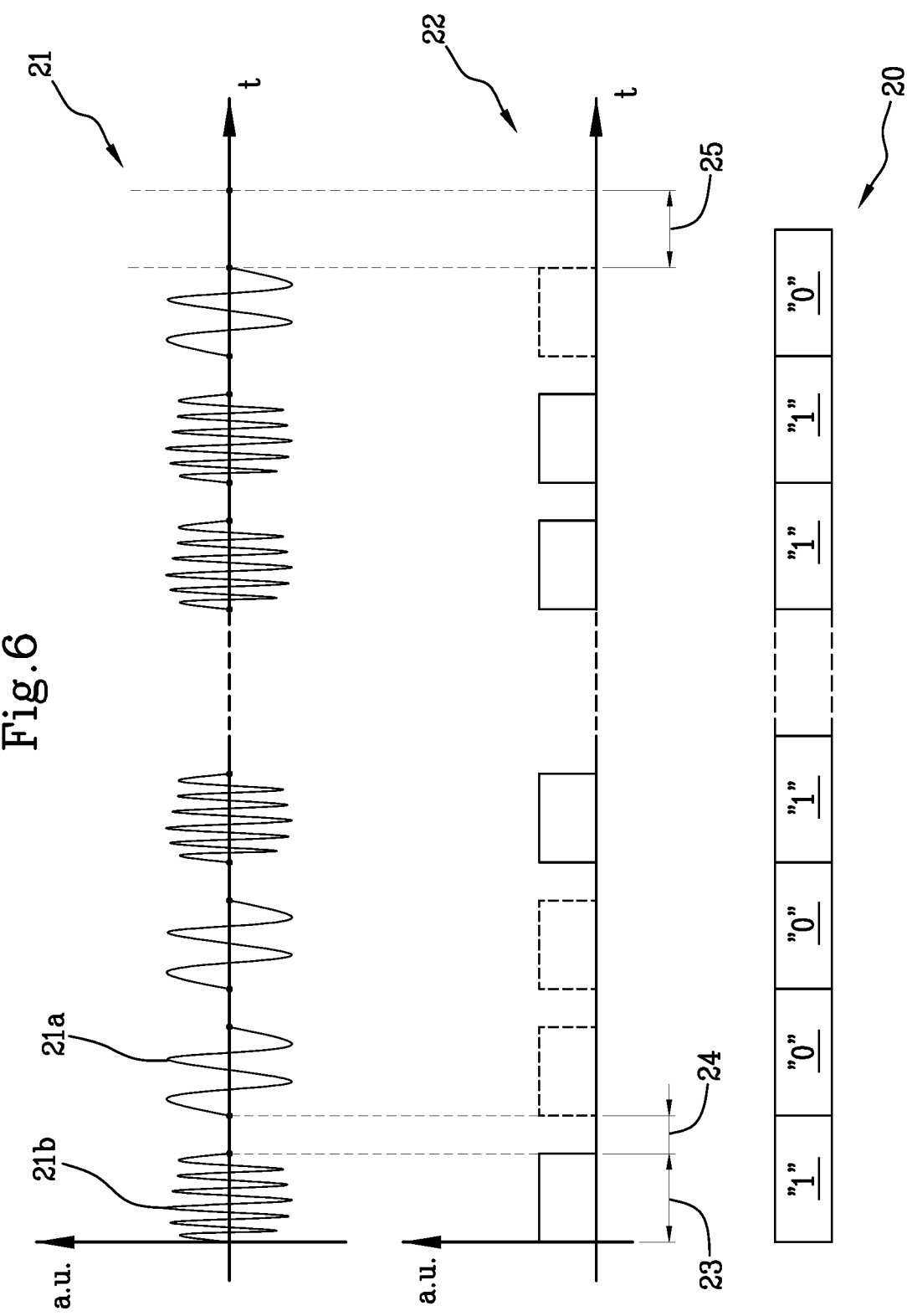

METHOD FOR CONTROLLING SORTING MACHINES

The present invention relates to the technical field of sorting systems.

More specifically, this invention relates to a control method for sorting machines and a relative sorting machine.

The invention is particularly suitable for being implemented on sorting systems of the "cross-belt" type, that is to say, systems wherein each carriage is equipped with a conveyor belt configured to move a body positioned above it, mainly in a direction perpendicular to the feed direction of the system, according to the various functions necessary during the loading step and unloading at the destination.

In more detail, the sorting machines of the cross-belt type consist of a train of carriages which occupies and moves along a closed circuit alongside the loading stations, which are designed to load on the carriages the objects to be sorted, and the unloading stations, where the objects are unloaded and generally accumulated to make efficient the work of the operators, who carry out the operations relating to the distribution and delivery to destination of the material sorted in this way.

The carriages, in this particular type of sorting machine, are equipped with a conveyor belt which can be activated by an electric motor in the direction at right angles to the direction of motion of the machine for receiving and sorting the objects.

The purpose of the loading stations is to determine the trajectory of the object being loaded to synchronise it with the motion of the carriage of the sorting machine designed to receive it, in such a way that the object can be transferred on board with the correct time and speed.

Generally, the unloading stations, on the other hand, consist of collection and storage chutes, or roller storage conveyors: the storage function is necessary to render efficient the work of the operators who transfer the sorted packages into containers, carriages, or directly into delivery means, in the case of couriers.

The various types of commands for activation of the belt are produced by the control system of the sorting machine, which knows at any instant the position along the path of each of its carriages.

The control system of the sorting machine is equipped with a group of sensors which constitute its encoder, with which it measures the basic forward movements of the sorting machine along the path.

It is therefore evident how machines and systems of this type require high precision levels, in particular as regards the communication of information within the system, in such a way as to allow the correct synchronisation between the loading-unloading stations and the individual carriages, thus guaranteeing that the objects to be sorted are correctly loaded/unloaded by activating the conveyor belt of each carriage at the opportune moment.

After defining the needs which the various types of operating modes must satisfy, a brief description is given of the various technological solutions applied in the automatic sorting sector for controlling the activation of the belt of the carriage of the cross-belt type of sorting machine.

A first technological solution for controlling sorting machines is based on contactless communication through the emission of modulated infrared light: a control device is positioned on the sliding track of the sorting machine in such a way that an optical alignment is possible with a suitable electronic unit located on board the carriage to be controlled, for a period of time sufficient for communication of the message with the values of the parameters which allow the on-board control unit to give to the motor the command to execute the requested function, for example loading-unloading.

The solution allows sufficient flexibility, thanks to the large data transmission capacity in the short time interval of the optical alignment, and allows direct command of the individual servomotor; it thus has characteristics of simplicity, however it requires preventive and corrective maintenance because the transmission by light pulses is easily subject to disturbances of an environmental type, such as, for example sunlight or artificial light.

The control method is also vulnerable to obscuring due to dust, fragments of paper and humidity, and infrared emitters are also greatly subject to ageing phenomena over time which can negatively affect, even significantly, the level of efficiency.

A second technological solution is based on radio transmission, in particular short-distance transmission through a slotted coaxial cable which covers the entire path of the sorting machine, divided into segments approximately one hundred metres long, each equipped with a communication apparatus.

The solution is available as a commercial standard to allow the extension of the field bus communication standards on mobile operating units in the industrial automation sector.

In this case, for practical and economic reasons, the carriages of the sorting machine are divided into trains of carriages, where a carriage for each train is equipped with devices for processing and communication with the communication apparatus of the segment of cable corresponding to the carriage.

The commands received are decoded and distributed to the various servo-drives of the motors mounted on the individual carriages which constitute the train.

The solution allows a great flexibility, thanks to the possibility of practically continuous communication between the control system and each of the trains of carriages: it makes it possible to dynamically change the loading or unloading trajectories without any constraint linked to the position of the carriage, to easily adapt to any requested operating speed and to easily vary the values of the various parameters which determine the activation of the belt of the individual carriage.

However, given the characteristics of the system, this solution is particularly complex and costly for application on sorting machines.

Moreover, any fault to the processing and communication devices of the carriage would cause the loss of the entire corresponding train of carriages, therefore requiring the performance of emergency maintenance operations which could require the stoppage of the entire system even for long periods of time.

Another technological solution which allows continuous communication with the carriages is based on the transmission of messages through pick-ups sliding on conductor bars positioned along the entire path of the sorting machine: this solution has already been used for many years and results in wear and requires regular replacement of the contacts, however it is still sufficiently practical and economical.

In these cases, conductor bars and sliding pick-ups are also used to bring the electricity on board which is needed for powering the servomotors.

The solution has practically the same advantages in terms of flexibility as the previous solution, and with regards the application to sorting machines it allows lower costs, however it also has the same drawbacks due to the complexity and the possibility, in the case of faults, of losing entire trains of carriages.

Moreover, the sliding pick-ups are particularly subject to wear, and sometimes to failure due to the high operating speed of the current sorting machines.

The solution therefore requires a continuous preventive control maintenance and corrective maintenance for replacement of the sliding pick-ups.

Lastly, there is a prior art solution based on patent EP 1216938 which uses the principle of magnetic induction for transmitting without elementary activation contact commands, using command inductors installed on the sliding tracks of the sorting machine which are able to emit a modulated magnetic field with one of two possible frequencies, the value of which defines the direction of rotation of the motor and therefore the loading-unloading direction of the carriage with respect to its feed direction.

The simplicity of the solution allows a high degree of reliability and easy maintenance, resulting, however, in limits in the applications due to lack of flexibility, since the elementary transmission of the commands does not allow parametric values.

However, this solution does not have very high performance levels, in particular in the sectors for sorting packages, in the postal sector and for logistics distribution, where there is generally a very high number of sorting destinations in very confined spaces, often with the need to be able to vary the sorting trajectories for accumulating the products at the outputs or for adapting to the features of certain products.

In many cases it is also generally required that the sorting machine can operate at least at two different operating speeds.

In these cases the previous requirements may be only partly satisfied, thereby increasing the constructional complexity and the cost of the system.

In this context, the technical purpose which forms the basis of this invention is to provide a control method for sorting machines which overcomes at least some of the above-mentioned drawbacks of the prior art.

More specifically, the aim of this invention is to provide a method for controlling sorting machines which is able to provide a greater flexibility and versatility, allowing a plurality of functions to be executed with different actuating parameters which are easily adjustable in such a way as to it easily adapt to the different application contexts of the sorting system.

The technical purpose indicated and the aims specified are substantially achieved by a control method for sorting machines comprising the technical features described in one or more of the appended claims.

The invention describes a method for controlling sorting machines which comprise a plurality of carriages, each of which comprises a loading-unloading device which can be selectively activated for loading-unloading an object from the carriage and an electronic unit configured for receiving and analysing a digital signal.

The method comprises the following steps:
moving the carriage along a sorting direction which has a plurality of loading-unloading stations each of which comprises respective inductors;
generating by means of the inductors a magnetic field with a variable frequency which modulates a digital signal uniquely associated with an operating mode selected from a plurality of possible operating modes of the carriage, in particular the digital signal comprising a bit string.
transmitting, by electromagnetic induction, the digital signal to the electronic unit of the carriage;
receiving the digital signal at the electronic unit and activating the load-unloading device according to the operating mode associated with the digital signal received from the electronic unit.

Another object of this invention is a sorting machine which comprises: a plurality of carriages, each of which comprises a loading-unloading device which can be selectively activated for loading-unloading an object from the carriage and an electronic unit configured for receiving and analysing a digital signal, which comprises a bit string, and actuating the loading-unloading device as a function of an operating mode uniquely associated with the string bit received by means of the digital signal.

Further features and advantages of the present invention are more apparent in the description below, with reference to a preferred, non-limiting embodiment of a control method for sorting machines as illustrated in the accompanying drawings, in which:

FIG. 6 shows an example of generating a digital signal by modulating a magnetic field;

Figure 1:
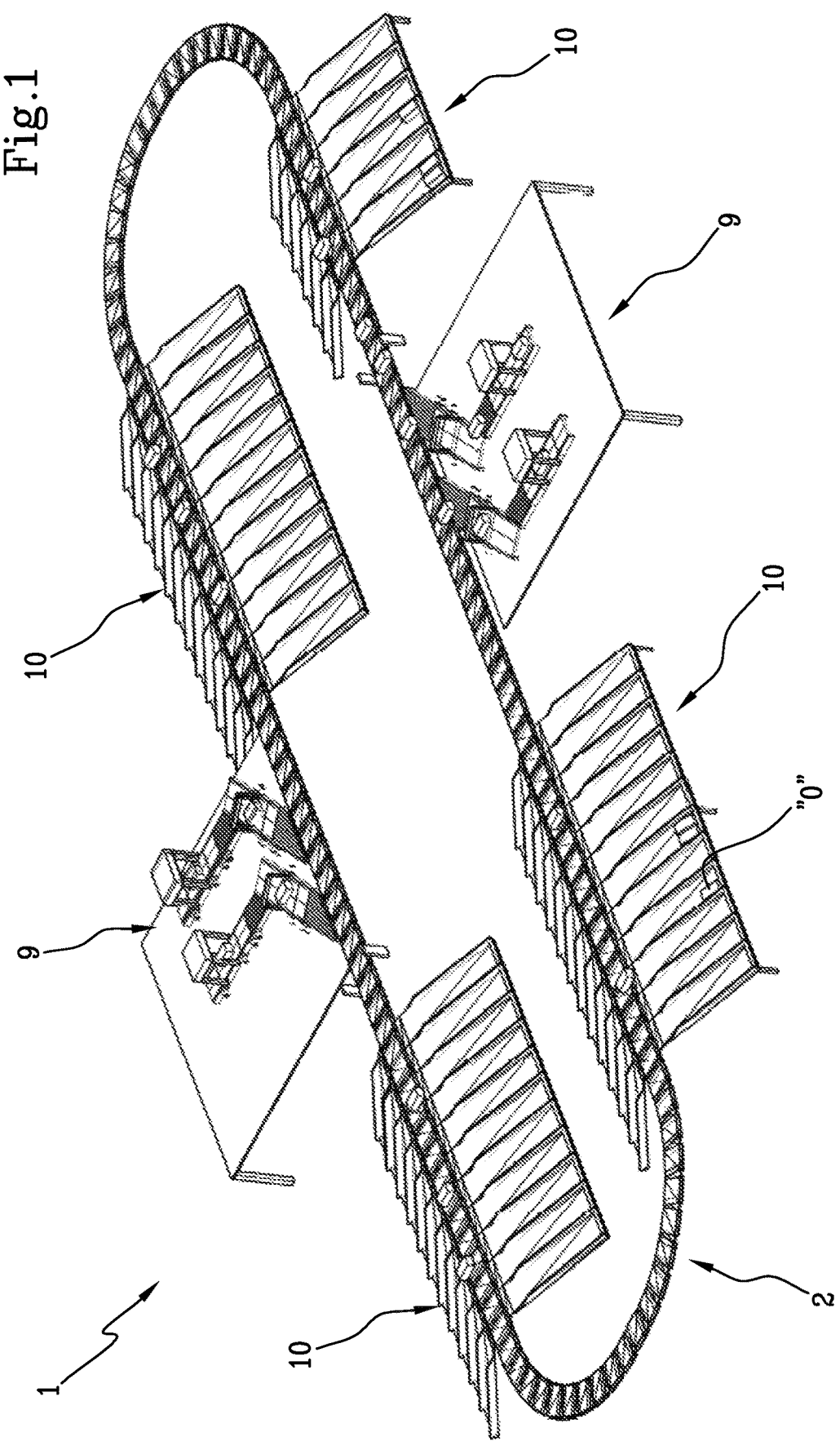
FIG. 1 shows a view of the sorting machine.

With reference to FIG. 1, the numeral 1 denotes in general a sorting machine which comprises a plurality of carriages 2 equipped with a loading-unloading device 3, which can be operated by a motor 8 which is also mounted on the carriage 2, and an electronic unit 4.

Figure 2:
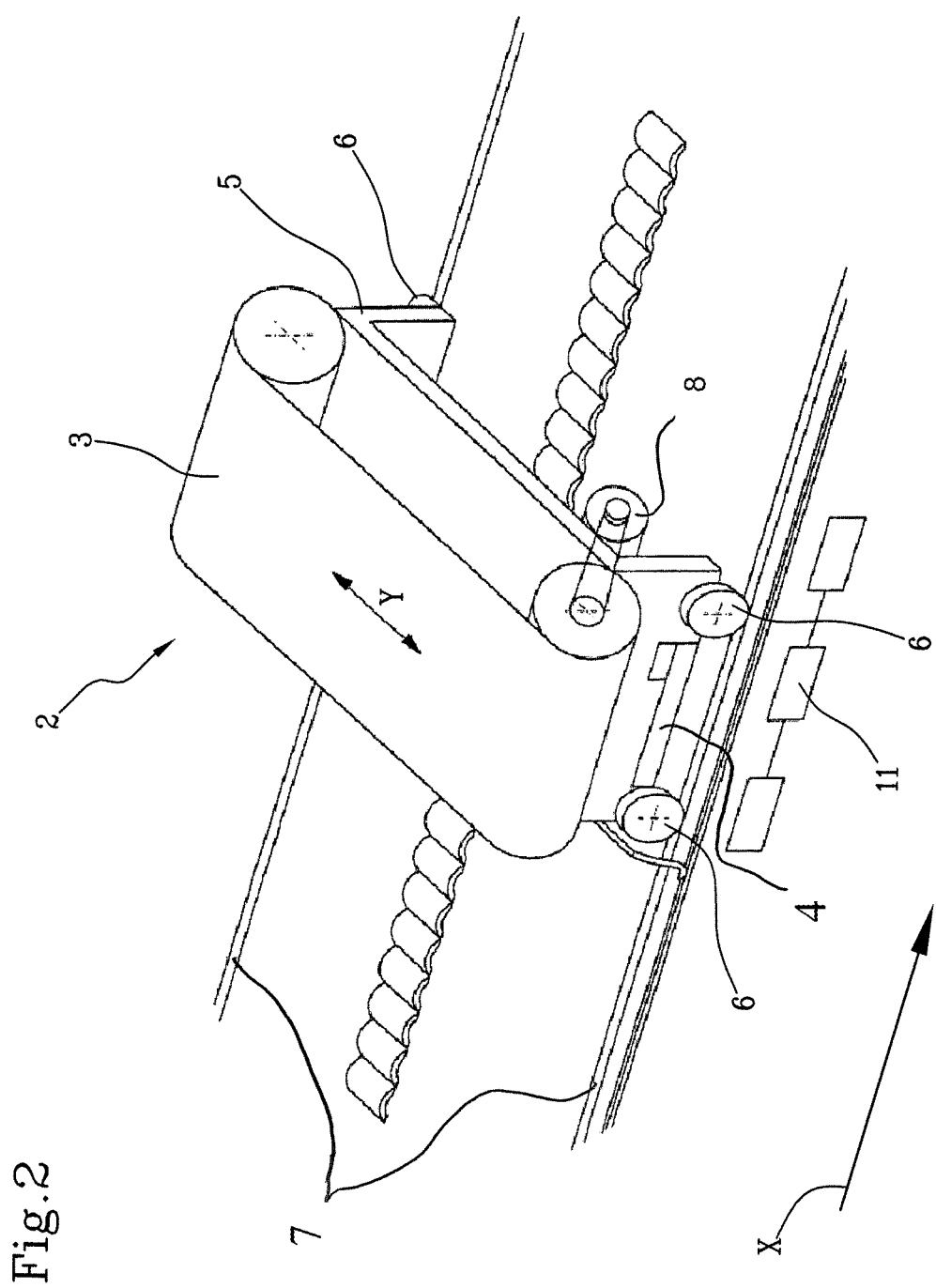
FIG. 2 is a detail of FIG. 1 which shows in detail a carriage of a sorting machine.

Each carriage 2, illustrated in detail in FIG. 2, also comprises a frame 5 equipped with wheels 6 and connected in a rotatable fashion with the adjacent carriages, in such a way as to form a continuous row positioned on a closed path 7 which defines a main sorting direction "X" along which is moved the continuous row of carriages 2.

In accordance with a preferred embodiment, the loading-unloading device 3 is made in the form of a conveyor belt located in a loading-unloading direction 'Y' perpendicular to the sorting direction.

Alternatively, the loading-unloading device 3 might be made, for example, by means of a plane which can be inclined.

Figure 5:
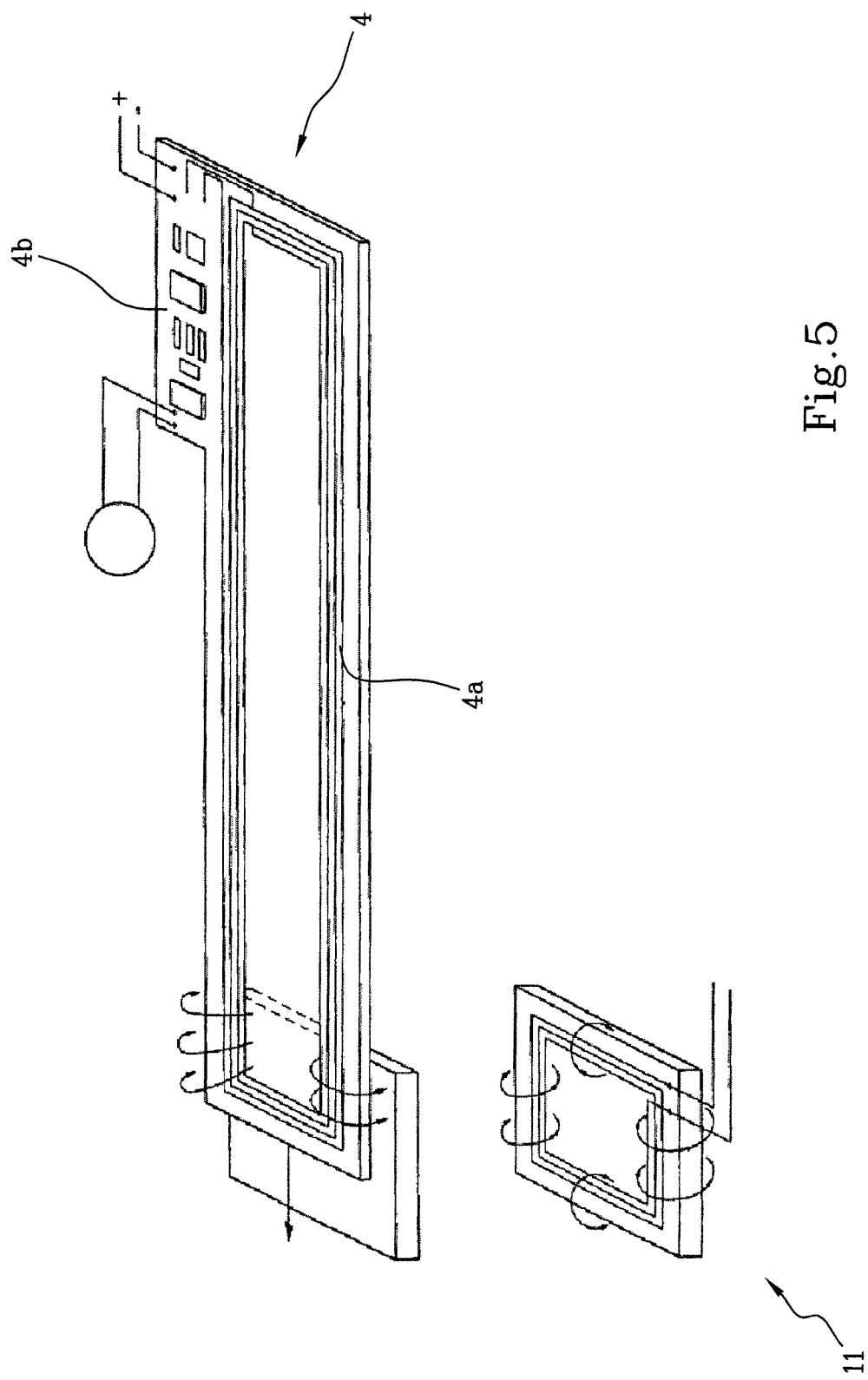
FIG. 5 shows an electronic unit mounted on board a carriage and the inductors of a loading or unloading station coupled with it.

The electronic unit 4, shown in detail in FIG. 5, comprises a receiving element consisting of windings 4a formed on a printed circuit, preferably of a length slightly less than the size of the carriage 2 along the sorting direction "X", in particular with a length of between 45% and 55% of the size of the carriage 2 along the sorting direction "X" and an electronic card 4b which is able to receive, process and if necessary generate an digital signal 20.

More specifically, each carriage 2 may have a length of between 700 mm and 900 mm, preferably each carriage 2 has a length of 800 mm and the windings 4a have a maximum length of between 350 mm and 400 mm, preferably 380 mm.

Figure 3:
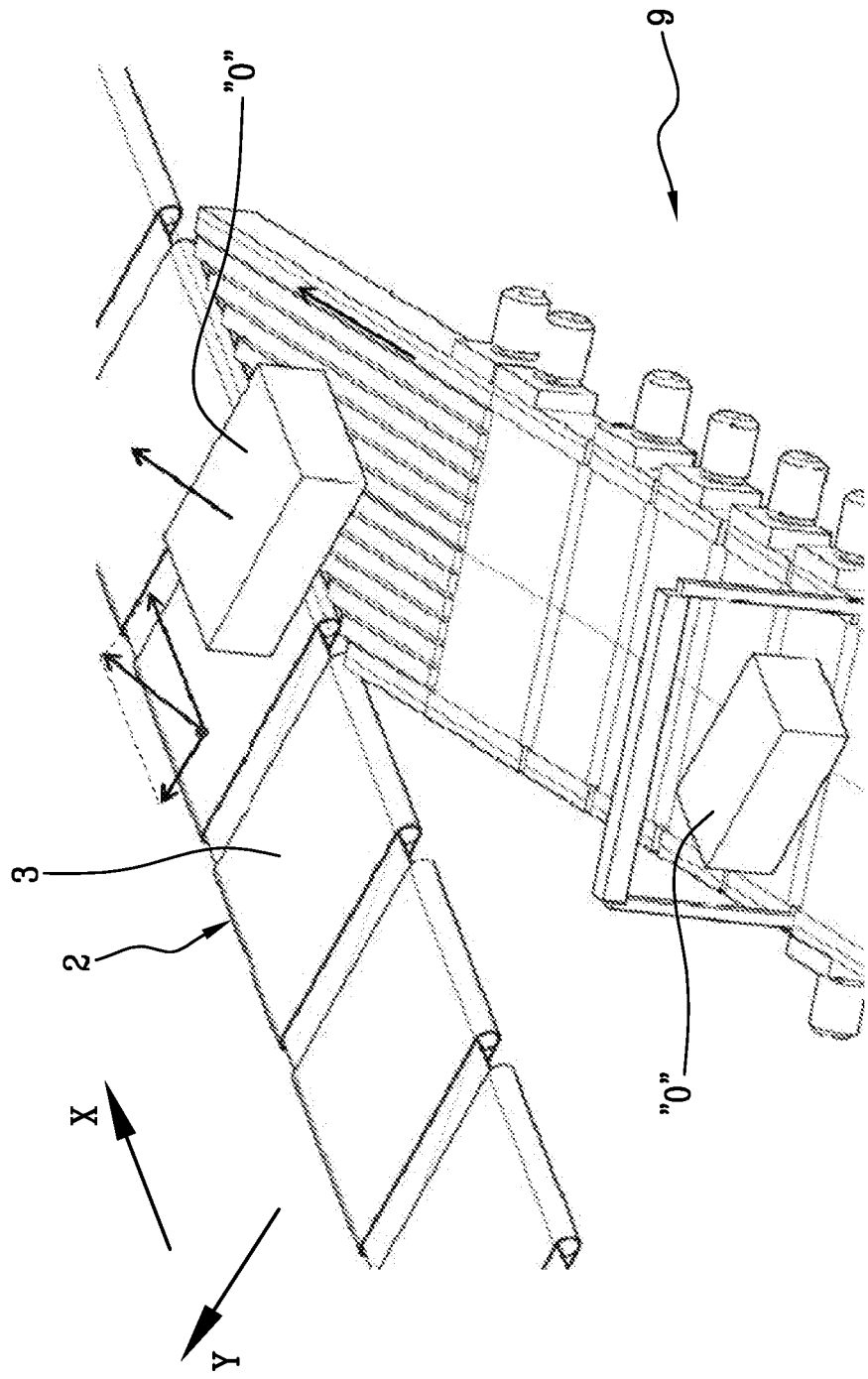
FIG. 3 is a detail of FIG. 1 which shows in detail a loading station of a sorting machine.
Figure 4:
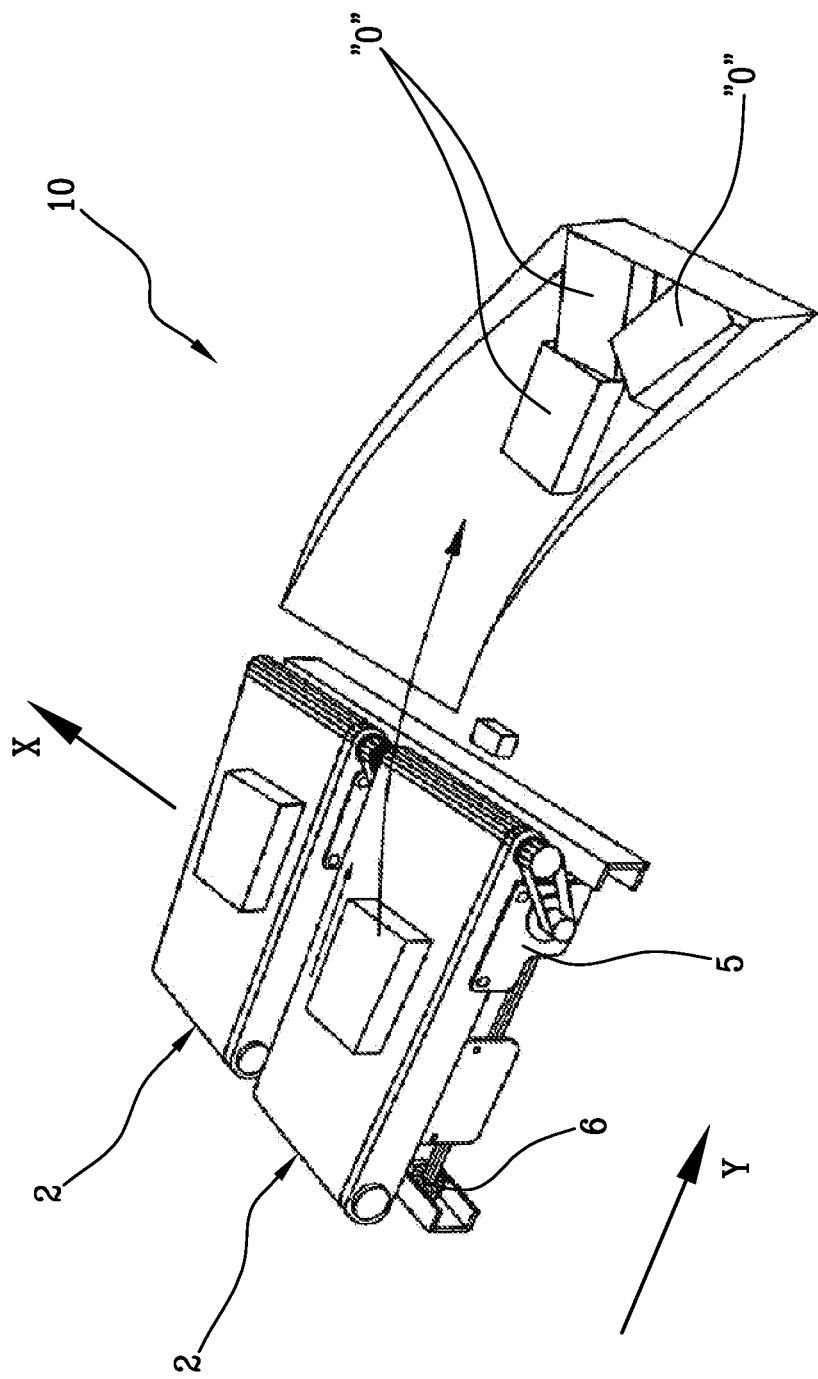
FIG. 4 is a detail of FIG. 1 which shows in detail an unloading station of a sorting machine.

The sorting machine 1 also comprises a plurality of loading stations 9 and a plurality of unloading stations 10, shown in detail in FIGS. 3 and 4 which are positioned along the sorting direction "X", in particular alongside the closed path 7 in such a way that the activation of loading-unloading device 3 of the carriage 2 allows an object "O" to be loaded on the carriage 2 from the loading stations 9 and to unload the same object "O" from the carriage to an unloading station 10.

Each station 9, 10 comprises an inductor 11 designed to generate a magnetic field with a variable frequency, preferably between 3 kHz and 55 kHz.

More specifically, the inductors are configured to generate a first magnetic field 21a with a frequency of between 3 kHz and 8 kHz, preferably 5 kHz, and a second magnetic field 21b with a frequency of between 47 kHz and 53 kHz, preferably 50 kHz.

In accordance with the Faraday law for magnetic induction, the electromotive force induced by a magnetic field in a closed line is equal to the opposite of the variation per unit time of the magnetic flux of the field through the surface delimited by the closed line.

When the inducer 11 modulates the frequency of the magnetic field generated, passing from one value to the other, an electrical signal is generated in the windings 4a of the electronic unit 4, which varies with the same frequency modulation of the field and is read, interpreted and actuated by the electronic card 4b.

It should be noted that the communication through the magnetic coupling by induction allows the transmission of control messages which encode the values of the parameters necessary for achieving the operating modes required to all the applications of the sorting machines, thereby providing the necessary flexibility, guaranteeing simultaneously the features of robustness, reliability, inexpensiveness and easy maintenance features of the communication through the inductive magnetic coupling.

More specifically, the command transmitted through the inductive magnetic coupling between the inductor 11 and the control unit 4 which controls the motor 8 of the carriage 2 consists of a digital signal 20 with a predetermined length and structure, where, as shown in FIG. 6, the two possible logic states of the individual bit of the message are coded through the emission of a signal 21 generated by the magnetic field modulated by the inductors 11 at one of the two predetermined frequencies.

In the preferred embodiment described here by way of a non-limiting example, the frequencies are in the range of between 3 kHz and 8 kHz, preferably 5 kHz, and in the range of between 47 kHz and 53 kHz, preferably 50 kHz.

More specifically, the control method for sorting machines 1, preferably made as described above, comprises moving the continuous row of carriages 2 along the sorting direction "X" which has at its sides the plurality of loading 9 and unloading 10 stations each equipped with the respective inductors 11.

In other words, in a configuration of use of the sorting machine 1, each carriage 2 is moved along the closed path 7 which defines the sorting direction "X", passing alongside the loading 9 and unloading 10 stations in such a way as to be able to receive a flow of objects coming from the first and conveying it to the second in a continuous fashion.

The method comprises a step of generating, by means of the inductors 11, a magnetic field with a variable frequency so as to modulate a digital signal 20, uniquely associated with an operating mode selected from a plurality of operating modes relating to the possible functions which can be executed by the carriages 2 and the parameters characterising these functions.

Consequently, each operating mode of the plurality of operating modes comprises and defines a function to be executed and a set of parameters in accordance with which to actuate the function.

More specifically, examples of possible functions which can be executed by the carriages 2 are: loading the carriage 2, unloading the carriage 2, centering the object "O" transported on the loading-unloading device 3.

A series of special operations can also be executed, that is to say, not strictly linked to the loading-unloading operations but useful in order to improve the efficiency, such as, for example: transmission of operating parameters of the sorting machine 1, transmission of commands for activating-deactivating components and peripherals which can be associated with the carriages 2, execution of the special functions characterised by sets of parameters which can be fixed and pre-set by the user.

The parameter set between which it is possible to choose for modifying and characterising the individual functions comprises parameters such as: direction of rotation of the loading-unloading device 3, speed of rotation of the loading-unloading device 3, acceleration and/or deceleration of the loading-unloading device 3, time delays preceding the start of the execution of the function selected, duration of the function.

Figure 7A:
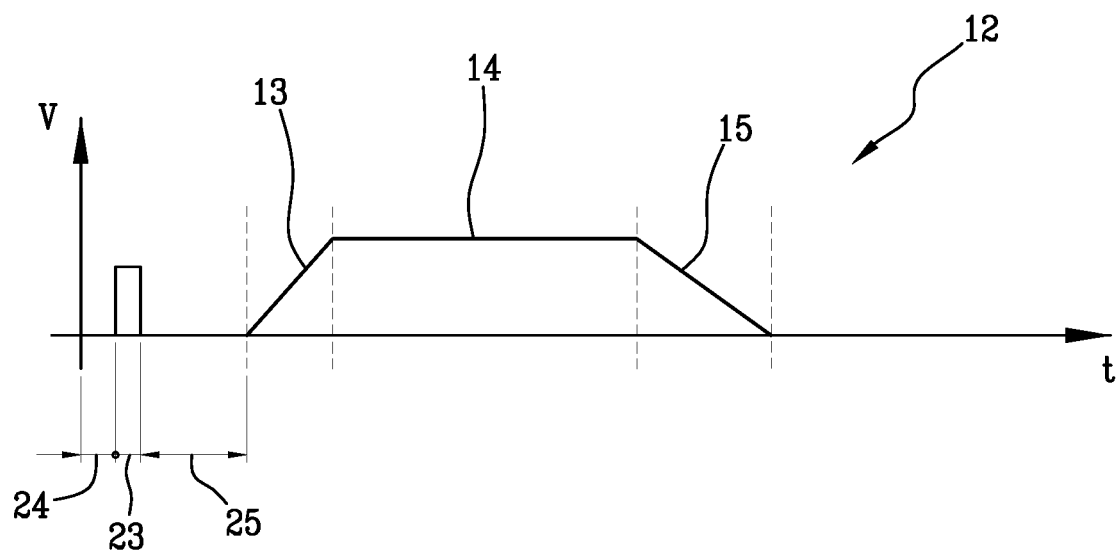
FIG. 7A shows a possible execution mode corresponding to a loading function.
Figure 7B:
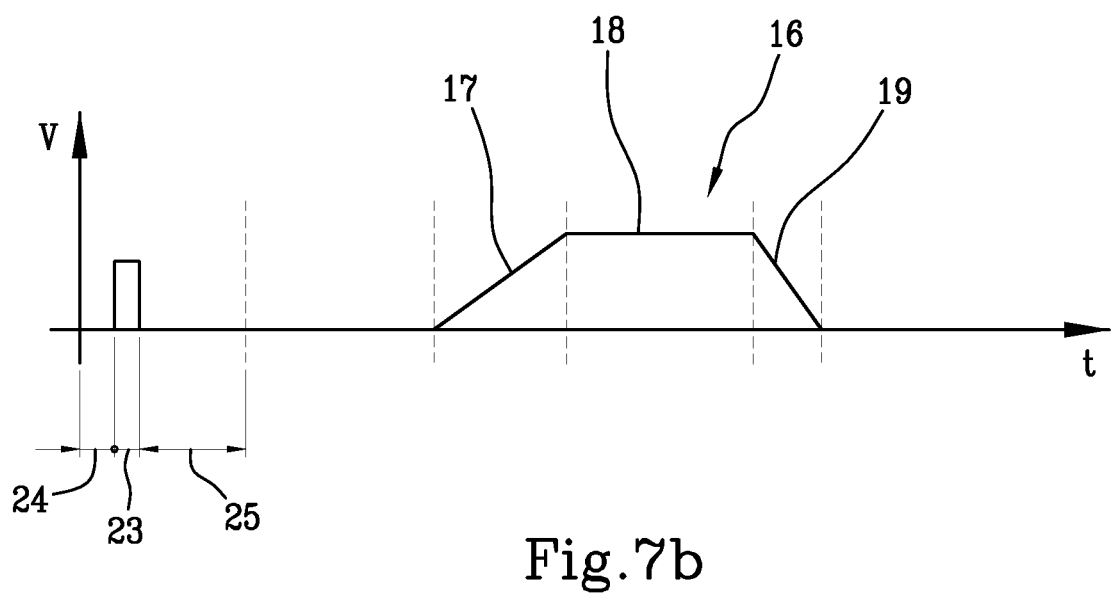
FIG. 7B shows a possible execution mode corresponding to an unloading function.

FIGS. 7A and 7B show in more detail the speed profiles relating to two of the possible operating modes which can be implemented by the control method according to the invention.

More specifically, FIG. 7A shows a function 12 for loading the carriage 2, in which the command for activating the loading-unloading device 3 on the carriage 2 for loading the object "O" on board requires an acceleration step 13, with an acceleration value such as to promote the receiving, and subsequently the maintaining of the speed value at a constant value 14 to bring the object "O" towards the centre of the loading-unloading device 3, in such a way as to maximise the stability.

Lastly, there is a deceleration step 15 for gradually reducing the quantity of motion of the object "O" preventing a slipping and eliminating, therefore, the consequent risk of a falling from the loading-unloading device 3.

Moreover, it is useful to be able to enter a variable delay between the receiving of the command and its actual execution in order to be able to efficiently adjust the input trajectories relative to the loading stations 9, to achieve applications where the sorting machine 1 can operate at different speeds.

In the case, on the other hand, of a function 16 for unloading the carriage 2, shown in detail in FIG. 7B, the command for activation of the load-unloading device 3 on the carriage 2 for unloading the object "O" on board requires an acceleration step 17 with an acceleration value such as not to allow the slipping of the object "O" and, therefore, maintaining the speed at a constant value 18 to give to the sorted objects "O" an output trajectory which is repeatable and independent of their weight; lastly, the loading-unloading device 3 is stopped by applying a predetermined default deceleration value 19.

Moreover, also in this case, it is useful to be able to enter a variable delay between the receiving of the command and its actual execution in order to be able to efficiently adjust the output trajectories relative to the unloading stations 10, to achieve applications where the sorting machine 1 can operate at different speeds.

It should be noted that the above-mentioned examples only represent some of the possible operating modes which can be implemented, illustrated in order to better clarify the operation of the sorting machine 1 and the control method according to the invention and should not therefore be deemed to be exhaustive and limiting lists both in terms of functions which can be executed and the parameter sets for their actuation.

The method then comprises transmitting, by means of magnetic induction, the digital signal 20 to the electronic unit of the carriage 2, in particular of the carriage 2 adjacent the loading station 9 or the unloading station 10 which comprises the inductor 11 which has generated the digital signal 20.

The digital signal 20 is received at the electronic unit 4 of the carriage 2 causing an activation of the loading-unloading device 3 according to the operating mode uniquely associated with the digital signal 20 received.

In order to correctly transmit all the information necessary for execution of the desired operating modes, the digital signal 20 comprises a bit string, preferably a string of 24 bits, by means of which all the information is coded relative to the selection of the function and, consequently, the operating parameters in accordance with which the function must be executed.

In order to define the logic state of the individual bits which make up the string, the inductors are configured to modulate the magnetic field in the range of between 3 kHz and 8 kHz, preferably 5 kHz, associated with the logic state "0" and in the range of between 47 kHz and 53 kHz, preferably 50 kHz, associated with the logic state "1".

Thus, the 24 bits of the 'message' transmitted consist, in practice, of a 'train' of 24 modulated pulses, of 5 or 50 kHz on the basis of the fact that consist of zeroes or units, separated from each other by a pause.

More specifically, the digital signal 20, generated by frequency modulation of the magnetic field, consists of a train of rectangular pulses 22 of duration, referred to as signal time 23, of between 2 ms and 3 ms, preferably 2.4 ms, and wherein each pulse is separated from an adjacent pulse by a pause time 24 of between 1 ms and 2 ms, preferably 1.5 ms.

In general, there is a control on the validity of the digital signal 20 which guarantees that digital signals 20 which have errors or which have not been transmitted/received correctly are not executed.

In order to confirm the correct reception of a bit the modulation of the magnetic field relative to that particular bit must have a precise predetermined duration, for example greater than 2 ms.

In the same way, in order guarantee the correct acquisition of the pause time 24 this must have a precise predetermined duration, for example greater than 1 ms.

When the pause time extends for a sufficiently long period of time, for example more than 2 ms, this is interpreted as an indication of end of transmission 25 which indicates that the digital signal 20 is complete, has been fully transmitted and that it is therefore possible to start the execution of the information contained in it.

Upon completion of the transmission it is still necessary, in order to avoid errors, to check the integrity of the digital signal 20, checking that the number of bits contained in the string is consistent with the planned number, that is, 24 bits in the case presented here by way of example.

It is evident that in the case in which the number of bits received and contained in the string is found to be greater than or less than 24 then the digital signal 20 is ignored.

It should be noted in particular that if the error is generated at the origin, that is to say, an error is detected, for example a bit with an incorrect logic value, already during the transmission of the digital signal 20, the inductors 11 are configured so as to cause the transmission of a further bit which therefore makes the string incompatible with the above-mentioned validity criterion.

Advantageously, it is also possible to reverse the direction of transmission of the digital signal 20 in such a way that it is transmitted from the electronic unit 4 towards the inductor 11 of a station 9, 10 adjacent at a predetermined moment, to the carriage 2.

In other words, it is possible to perform a transmission of data/information from each station 9, 10 to each carriage 2 and vice versa, increasing in this way the versatility of the sorting machine 1 and allowing, for example, the execution of even complex operations such as updating the firmware of the electronic unit 4.

For this purpose, the electronic unit 4 is configured to generate a magnetic field with a variable frequency modulating a digital signal and each loading station 9 and each unloading station 10 is configured to receive and analyse the digital signal 20 comprising a bit string.

Advantageously, the control method according to the invention makes it possible to overcome the above-mentioned problems of the prior art.

In fact, the introduction of a multi-bit control signal makes it possible to render the sorting machine 1 more versatile and easily adaptable to a multiplicity of situations and possible different uses.

The possibility of transmitting a multiplicity of information from and to the individual carriages makes it possible to execute a wide variety of functions for which it is also possible to select a set of actuation parameters.

In this way, if it is necessary to change the characteristics, for example the weight or size, of the objects "O" to be conveyed or operations are performed for expanding, modifying or renewing the sorting machine 1 or the system in which it operates, it would be sufficient to modify the contents of the digital signal 20 in order to always guarantee the maximum efficiency, without requiring complex and costly structural operations on the machine itself.

The invention claimed is:

1. A method for controlling a sorting machine (1) comprising a plurality of carriages (2), each carriage (2) comprising a loading-unloading device (3) which rotates and which can be selectively activated for loading-unloading an object (O) from the carriage (2) and an electronic unit (4) configured to receive and analyse a digital signal (20), the sorting machine (1) being configured and controlled (a) so that the sorting machine can operate at two different speeds, that is, at a first operating speed and at a second operating speed which is higher than the first operating speed, and (b) so that each carriage (2) moves in a sorting direction (X) at a first velocity when the sorting machine (1) is operating at the first operating speed and moves in the sorting direction (X) at a second velocity when the sorting machine (1) is operating at the second operating speed, said second velocity being higher than said first velocity;

the method comprising the steps of:
moving the carriage (2) along the sorting direction (X) having a plurality of loading stations (9) and a plurality of unloading stations (10) each comprising respective inductors (11);

generating through the inductors (11) a magnetic field with a variable frequency modulating the digital signal (20) uniquely associated with an operating mode selected from the group consisting of loading the carriage and unloading the carriage, the digital signal (20) comprising a bit string; the digital signal (20) including a command;

transmitting, by electromagnetic induction, the digital signal (20) to the electronic unit (4) of the carriage (2);

receiving the digital signal (20) at the electronic unit (4); and executing the command, including activating the loading-unloading device (3) according to the selected operating mode uniquely associated with the received digital signal (20);

wherein, when the sorting machine (1) is operating at the first operating speed, a first time delay is provided to provide a delay between the receiving of the digital signal (20) and the execution of the command to adjust and provide for timely loading or unloading of the object (O) by the loading-unloading device (3);

wherein, when the sorting machine (1) is operating at the second operating speed, a time delay which is less than the first time delay or which is zero, is provided between the receiving of the digital signal (20) and the execution of the command to adjust and provide for timely loading or unloading of the object (O) by the loading-unloading device (3).

2. The method according to claim 1, wherein the bit string comprises 24 bits.

3. The method according to claim 1, comprising a step of modulating the frequency of the magnetic field to determine a logic state of the bits of the digital signal (20).

4. The method according to claim 3, wherein the frequency of the magnetic field associated with a logic state '0' is between 3 kHz and 8 kHz, and the frequency of the magnetic field associated with a logic state '1' is between 47 kHz and 53 kHz.

5. The method according to claim 4, wherein the frequency of the magnetic field associated with the logic state '0' is equal to 5 kHz, and the frequency of the magnetic field associated with the logic state '1' is equal to 50 kHz.

6. The method according to claim 1, wherein the digital signal (20) consists of a train of rectangular pulses (22) of duration of between 2 ms and 3 ms, and wherein each pulse is separate from an adjacent pulse by a pause time of between 1 ms and 2 ms.

7. The method according to claim 1, comprising a step of reversing a transfer direction of the digital signal to transmit a digital signal from the electronic unit (4) of the carriage (2) to the plurality of loading (9) or unloading (10) stations.

8. The method according to claim 1, wherein the digital signal (20) is modulated by means of a frequency-shift keying modulating diagram.

9. The method according to claim 1, wherein the digital signal (20) consists of a train of rectangular pulses (22) of duration of 2.4 ms, and wherein each pulse is separate from an adjacent pulse by a pause time of 1.5 ms.

10. The method according to claim 1, wherein the digital signal (20) consists of a train of rectangular pulses (22) of duration of greater than 2 ms, and wherein each pulse is separate from an adjacent pulse by a pause time of greater than 1 ms.

11. The method according to claim 1, wherein each carriage (2) has a length of between 700 mm and 900 mm.

12. The method according to claim 1, wherein the loading-unloading device (3) comprises a conveyor belt which rotates.

13. A sorting machine comprising a plurality of carriages (2), each carriage (2) comprising:

a loading-unloading device (3) which rotates and which can be selectively activated for loading-unloading an object (O) from the carriage (2);

an electronic unit (4) configured to receive and analyse a digital signal (20) comprising a bit string and actuating the loading-unloading device (3) as a function of an operating mode selected from the group consisting of loading the carriage and unloading the carriage;

wherein the sorting machine (1) is configured and arranged (a) so that the sorting machine can operate at two different speeds, that is, at a first operating speed and at a second operating speed which is higher than the first operating speed, and (b) so that each carriage (2) moves in a sorting direction (X) at a first velocity when the sorting machine (1) is operating at the first operating speed and moves in the sorting direction (X) at a second velocity when the sorting machine (1) is operating at the second operating speed, said second velocity being higher than said first velocity;

wherein the sorting machine (1) is configured and arranged to operate according to a method comprising the steps of:

moving the carriage (2) along the sorting direction (X) having a plurality of loading stations (9) and a plurality of unloading stations (10) each comprising respective inductors (11);

generating through the inductors (11) a magnetic field with a variable frequency modulating the digital signal (20) uniquely associated with an operating mode selected from the group consisting of loading the carriage and unloading the carriage, the digital signal (20) comprising a bit string; the digital signal (20) including a command;

transmitting, by electromagnetic induction, the digital signal (20) to the electronic unit (4) of the carriage (2);

receiving the digital signal (20) at the electronic unit (4); and executing the command, including activating the loading-unloading device (3) according to the selected operating mode uniquely associated with the received digital signal (20);

wherein, when the sorting machine (1) is operating at the first operating speed, a first time delay is provided to provide a delay between the receiving of the digital signal (20) and the execution of the command to adjust and provide for timely loading or unloading of the object (O) by the loading-unloading device (3);

wherein, when the sorting machine (1) is operating at the second operating speed, a time delay which is less than the first time delay or which is zero, is provided between the receiving of the digital signal (20) and the execution of the command to adjust and provide for timely loading or unloading of the object (O) by the loading-unloading device (3).

14. The sorting machine according to claim 13, comprising a plurality of loading stations (9) and a plurality of unloading stations (10) positioned along the sorting direction (X), each station (9, 10) comprising respective inductors (11) designed to generate a magnetic field with a variable frequency modulating the digital signal (20).

15. The sorting machine according to claim 14, wherein the inductors (11) are configured for generating magnetic fields with a frequency of between 3 kHz and 55 kHz.

16. The sorting machine according to claim 13, wherein the loading-unloading device (3) comprises a conveyor belt which rotates.

17. The sorting machine according to claim 13, wherein the electronic unit (4) is configured to generate a magnetic field with a variable frequency modulating the digital signal (20) and each loading (9) or unloading (10) station is configured to receive and analyse the digital signal (20) comprising a bit string.

* * * * *